United States Patent [19]

Leightner et al.

[11] Patent Number: 4,483,598
[45] Date of Patent: Nov. 20, 1984

[54] GUN SIGHT

[75] Inventors: Robert A. Leightner, Burlington; Henry Thibault, Colchester, both of Vt.

[73] Assignee: General Electric Company, Burlington, Vt.

[21] Appl. No.: 395,216

[22] Filed: Jul. 6, 1982

[51] Int. Cl.³ .................. G02B 23/04; G01C 1/00
[52] U.S. Cl. ............................. 350/558; 356/1; 356/144
[58] Field of Search ................ 350/557–558; 356/1, 140, 141–146

[56] References Cited

U.S. PATENT DOCUMENTS

| | | | |
|---|---|---|---|
| 1,047,051 | 12/1912 | Hasselkus | 350/541 |
| 1,290,777 | 1/1919 | O'Brien | 350/558 |
| 2,409,186 | 10/1946 | Bouwers | 350/558 |
| 2,619,874 | 12/1952 | Lane | 88/33 |
| 2,753,760 | 7/1956 | Braymer | 88/32 |
| 2,758,013 | 12/1951 | Monk | 88/32 |
| 2,994,245 | 8/1961 | Wagner | 356/145 |
| 3,152,214 | 10/1964 | Korones et al. | 88/57 |
| 3,407,302 | 10/1968 | Bouwers | 250/213 |
| 3,572,886 | 3/1971 | Cupertino | 350/558 |

OTHER PUBLICATIONS

"Applications of Geometrical Optics," *Proceedings of the Society of Photo–Optical Instrumentation Engineers*, vol. 39, Aug. 27–29, 1973.

"Description and Instructions for the use of the Jungner KS-2 Sight," Jungner Instrument, Bes-1412-E, Apr. 27, 1976.

Jungner Brochure 73-3565-E Title: Anti Aircraft Sight KS-2 (4 pages).

Fraser, D. B., "Design of a Low Cost, High Magnification, Passively Stabilized Monocular, The Stedi-Eye," Proc. Soc. of Photo-Optical Instrumentation Engineers, vol. 39, San Diego Calif. 8–1973, pp. 251–259.

*Primary Examiner*—William H. Punter
*Attorney, Agent, or Firm*—Bailin L. Kuch

[57] ABSTRACT

This invention provides an optical sight comprising a first telescope having a fixed increasing magnification whose image is combined and overlayed with the image of a second telescope having a selectable increasing magnification. The magnification of the second telescope is selected by the gunner at the beginning of the engagement in accordance with a known, conventional engagement speed of the target aircraft, thereby permitting the gunner to remember a chart of multiple target lengths for different target ranges without further consideration of target speed.

7 Claims, 3 Drawing Figures

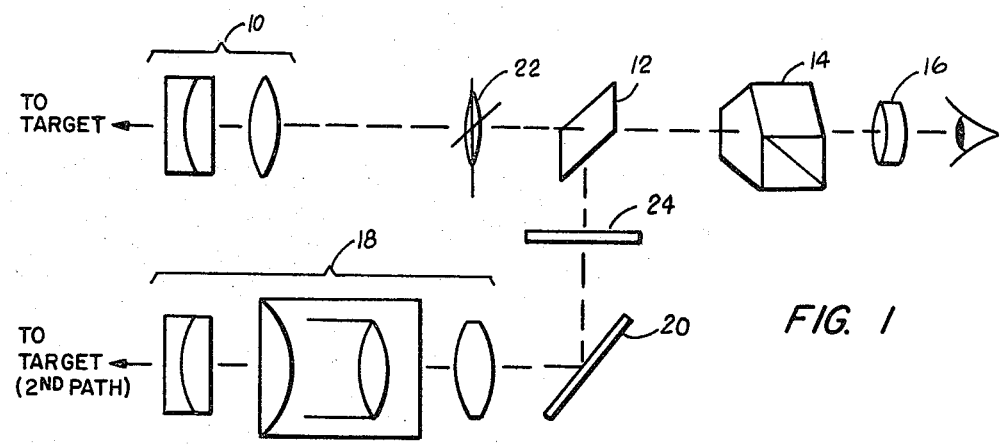
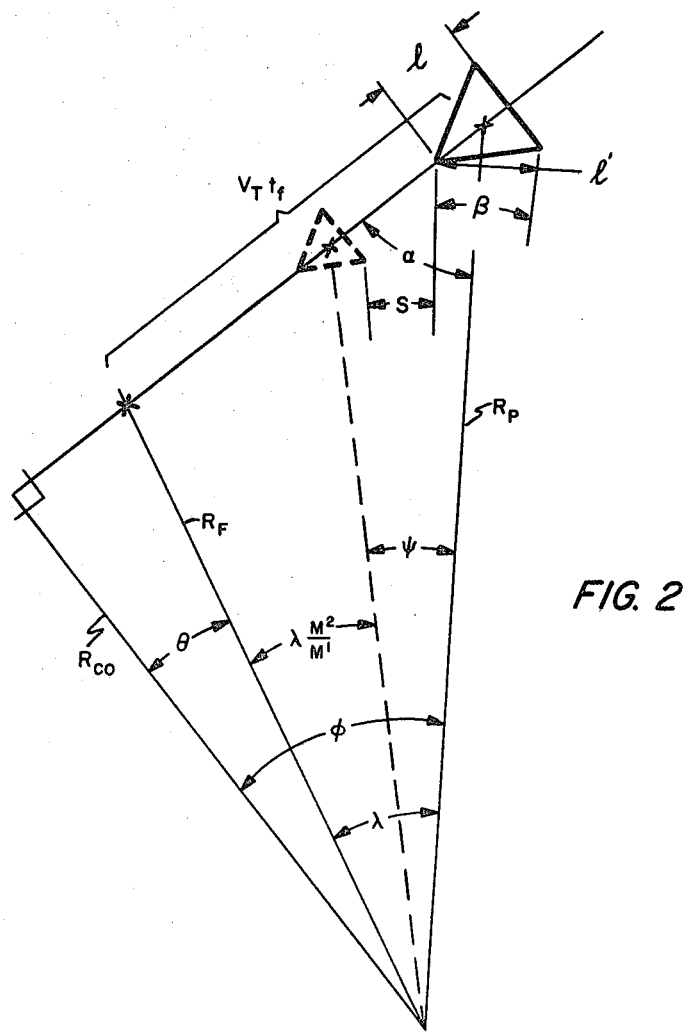
FIG. 1
FIG. 2

GUN SIGHT

BACKGROUND OF THE INVENTION

1. Field of the Invention

This invention relates to a simple, optical, lead angle determining gun sight which is particularly adapted for antiaircraft defense.

2. Prior Art

The typical iron speed ring gun sight comprises an objective of three concentric rings spaced forwardly of an ocular ball. The sight is designed to work at a predetermined cross-over distance, e.g. 800 meters for a 20 mm gun. Each particular type of aircraft is assumed to fly in cross-over at a known, predetermined speed. The gun is bore-sighted to the center of the rings. In use, the sight is aimed so that the target aircraft lies on an appropriate speed ring, e.g. outer ring for 300 knots, middle ring for 200 knots, inner ring for 100 knots, on a flight path directed towards the center of the rings.

An improvement on the iron sight comprises a combination prism and a slightly reducing, fixed power, telescopic system. The image from the telescopic system is combined with the directly observed target in the combination prism so that the eye sees two images of the target, one of which is larger than the other. When the sight is aimed at a fixed target, the images should be concentric. The sight is aimed at a moving target so that the larger image should chase the smaller image (from the telescopic system) along a common flight path, whith a predetermined multiple of large image target lengths between them. The lead angle between the two images is a fictitious lead angle and forms only a predetermined fraction of the real lead angle. The gunner must consult a chart showing the multiple of target lengths to be used for each combination of target speed and range; e.g. for four speeds and three ranges, one out of twelve possible multiple lengths must be selected.

Other optical systems of interest are shown in: U.S. Pat. No. 1,047,051 which shows a two-field view system. U.S. Pat. No. 3,152,214 which shows a 300 m system to change the field of view. U.S. Pat. No. 2,619,874 which shows a two-field view system. U.S. Pat. No. 3,407,302 which shows a system to change optical paths. U.S. Pat. No. 2,753,760 which shows an image changing system. U.S. Pat. No. 2,578,013 which shows a drift sight.

SUMMARY OF THE INVENTION

It is an object of this invention to provide an optical sight which is an improvement over the combination prism and fixed power telescopic system.

It is another object to provide an optical sight which is simpler and easier to use than the combination prism and fixed power telescopic system.

A feature of this invention is the provision of an optical sight comprising a first telescope having a fixed increasing magnification whose image is combined with the image of a second telescope having a selectable increasing magnification. The magnification of the second telescope is selected by the gunner at the beginning of the engagement in accordance with the known, conventional engagement speed of the target aircraft, thereby permitting the gunner to remember a chart of multiple target lengths for different target ranges without further consideration of target speed.

Another feature of this invention is the provision of such a sight wherein the combined images are viewed through an image stabilizing mechanism.

BRIEF DESCRIPTION OF THE DRAWING

These and other objects, features and advantages of this invention will be apparent from the following specification thereof taken in conjunction with the accompanying drawing in which:

FIG. 1 shows a first embodiment of this invention;

FIG. 2 is a diagram of the trigonometry involved in this invention; and

DESCRIPTION OF THE INVENTION

Figure 3:
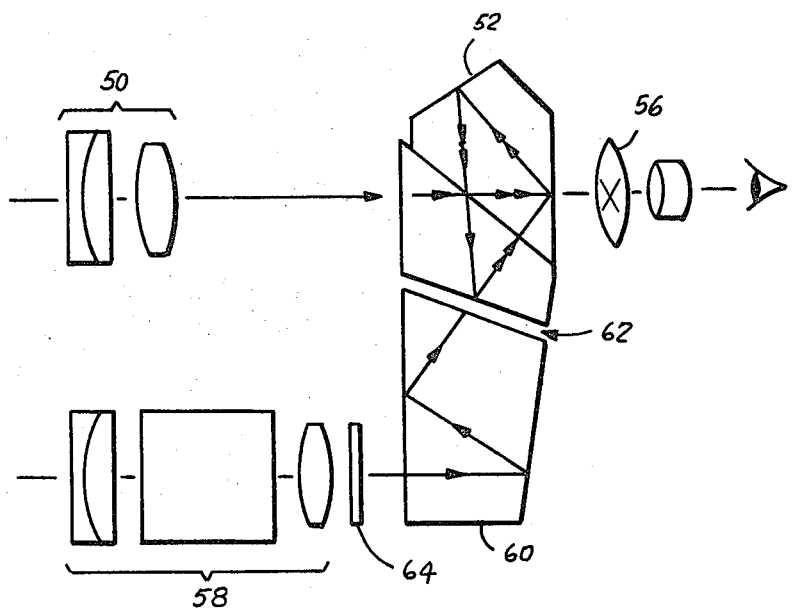
FIG. 3 shows a second embodiment of this invention.

The optical sight shown in FIG. 1 includes a conventional first telescope 10 of fixed magnification, such as 3X, whose first image passes through a half-silvered combining glass 12, a stabilization and erection prism 14, and an eyepiece 16. The stabilizing and erection prism may be of the passive-pendulous-gimballed type shown in The Proceedings of the Society of Photo-Optical Instrumentation Engineers, Vol. 39, San Diego, Calif., Aug. 27–29, 1973, pp. 251–257.

A conventional zoom second telescope 18 is adjacent and parallel to the telescope 10 and its second image is reflected by a mirror 20 to the combining glass 12, and thence to the prism 14 and the eyepiece 16.

Both telescopes are fixed to and boresighted to the firing barrel of the gun. A removable reticle 22 is placed in the path of the first image, between the telescope 10 and the combining glass 12. A removable shutter 24 is placed in the path of the second image, between the mirror 20 and the combining glass 12.

The first image may be used by itself against fixed or slow motion targets, such as surface targets, with the reticle 22 in place and superimposed on the first image, and the shutter 24 in place to block the second image.

The second image may be added to the first image by removing the shutter 24 from the path of the second image. The reticle is removed from the path of the first image. In this configuration, the sight may be used to advantage against rapid motion targets such as aircraft to provide a suitable lead angle.

It will be appreciated that each type of aircraft conventionally engages against a surface target at an established speed which is a function of the handling characteristics of that particular aircraft. Therefore, the gunner on the surface who proposes to shoot at the aircraft is able to estimate in advance what the speed of the aircraft will be after he has identified the aircraft by its type. The gunner then adjusts the magnification of the second telescope in accordance with the established engagement speed of the target, as for example:

| 300 m Magnification | Target Speed |
| --- | --- |
| 2.5X | 600 Knots |
| 2.4X | 500 Knots |
| 2.3X | 400 Knots |
| 2.2X | 300 Knots |
| 2.1X | 200 Knots |
| 2.0X | 100 Knots |

The gunner then sights through the eyepiece 16 at the target so as to have the larger first image aft of the smaller second image and both flying along a common path, which path will cross the center of the field, but which images are spaced apart by a selected multiple of lengths of the second image. The selected multiple is a function of the distance of the target aircraft and the course it is flying.

In the case of the target aircraft flying by the gunner on a course which will not pass over the gunner, the following tracking rule will apply for a typical 20 mm round of ammunition:

| Distance of target from gunner | Multiple |
| --- | --- |
| 2500-2000 meters | 4 |
| 2000-1500 meters | 3 |
| 1500-1000 meters | 2½ |
| 1000-500 meters | 2 |

In the case of the target aircraft attacking the gunner on a course which starts as a fly by and curves into a pass over, the following tracking rule will apply:

| Distance of target from gunner | Multiple |
| --- | --- |
| 2500-2000 meters | 4 |
| 2000-1500 meters | 2 |
| 1500-1000 meters | 1 |
| 1000-500 meters | ½ |

In the case of the target aircraft attacking the gunner on a course which is directly at the gunner and passes over, the two images would be superimposed to provide zero lead angle.

The use of relative magnification as a function of velocity of the target can be explained as follows in conjunction with FIG. 2:

Let $M_1$ = magnification of fixed telescope = 3X
$M_2$ = magnification of variable telescope
$R_{CO}$ = cross-over range of target
$R_F$ = future range of target at time of bullet impact and here of firing gun barrel
$R_P$ = present range of target at time of firing
$V_T t_f$ = velocity of target x time of flight of projectile
$\theta$ = angle between $R_{CO}$ and $R_F$
$\phi$ = angle between $R_{CO}$ and $R_P$
$\lambda = \phi - \theta$ = lead angle
$S$ = perceived space between small and large images of target
$\beta$ = perceived angular length of large target
$l^1$ = perceived chordal length of large target
$\alpha$ = angle between path of flight of target and present gunner to target axis
$\psi$ = angle between small target and large target
$l$ = target length $$m_1 = 3\times$$

$$m_2 = \text{zoom} \times = \text{lower power}$$

$$l^1 = l\cos\alpha$$

$$\psi = \lambda - \lambda \frac{m^2}{m^1}$$

$$\psi = \lambda\left(1 - \frac{m^2}{m^1}\right)$$

$$\alpha = \sin^{-1}\left(\frac{R_{CO}}{R}\right)$$

$$\beta = \sin^{-1}\left(\frac{l^1}{R}\right) = \sin^{-1}\left(\frac{l\cos\alpha}{R}\right)$$

$$\beta = \sin^{-1}\frac{l\cos\left(\sin^{-1}\frac{R_{CO}}{R}\right)}{R}$$

$$\psi = (\phi - \theta)\left(1 - \frac{m^2}{m^1}\right)$$

$$\psi = \left(\cos^{-1}\frac{R_{CO}}{R} - \cos^{-1}\frac{R_{CO}}{R_F}\right)\left(1 - \frac{m^2}{m^1}\right)$$

$$\psi = \left(\tan^{-1}\sqrt{\frac{R^2 - R_{CO}^2}{R_{CO}}} - \tan^{-1}\left(\frac{\sqrt{R^2 - R_{CO}^2} - V_T t_f}{R_{CO}}\right)\right)\left(1 - \frac{m^2}{m^1}\right)$$

$$S = \psi - \frac{\beta}{1} - \frac{\beta m^2}{2m^1} = \psi - \frac{\beta}{2}\left(1 - \frac{m^2}{m^1}\right)$$

$$\frac{S}{\beta} = \left(\cos^{-1}\left(\frac{R_{CO}}{R}\right) - \cos^{-1}\left(\frac{R_{CO}}{R_F}\right) - \frac{\beta}{2}\right)\left(1 - \frac{m^2}{m^1}\right)\frac{1}{\beta}$$

$$\frac{S}{\beta} = \frac{\psi}{\beta} = \frac{1}{2}\left(1 - \frac{m^2}{m^1}\right)$$

$$\frac{S}{\beta} = \left\{\frac{\cos^{-1}\left(\frac{R_{CO}}{R}\right) - \cos^{-1}\left(\frac{R_{CO}}{R_F}\right)}{\sin^{-1}\left\{\frac{l\cos\sin^{-1}\left(\frac{R_{CO}}{R}\right)}{R}\right\}} - \frac{1}{2}\right\}\left(1 - \frac{m^2}{m^1}\right)$$

Let $S/\beta = 1$ at 1000 meters
and let $m_1 = 3$
then $S/\beta$ is a function of range only.

FIG. 3 shows a compact variation of the embodiment of the invention. A fixed telescope 50 provides a first large image to a stabilizing-erecting prism 52 and thence to an eyepiece 54. A reticle 56 is normally removed from the path of the image, except when the fixed telescope is used alone against relatively fixed targets. A zoom telescope 58 provides a second, adjustably smaller image to a prism 60 which passes it through a partially reflecting surface 62 whereat it is combined and overlayed with the first image in the prism 52. A shutter 64 is normally removed from the path of the second image, except when the fixed telescope is used alone against relatively fixed targets.

What is claimed is:

1. An optical sight for providing a lead angle for a moving target comprising:
   a first telescope having a fixed increasing first magnification for providing a first relatively large image of the target;
   a second telescope having means for providing a selectable increasing second magnification for providing a second image, which is smaller than said first image, of said target, said second magnification being a function of a characteristic of the relationship of said target to said sight;
   an eyepiece;
   means for simultaneously combining and overlaying said first and said second images and for providing such combined and overlayed image to said eyepiece.

2. A sight according to claim 1 wherein:
   said characteristic of the relationship of said target to said sight is the velocity of said target with respect to said sight.

3. A sight according to claim 2 wherein:
   said means for combining said first and said second images is an image stabilizing and erecting prism.

4. A sight according to claim 2 wherein:
   a reticle is removably disposed in the path of the image provided by said first telescope.

5. A sight according to claim 2 wherein:
   a shutter is removably disposed in the path of the image provided by said second telescope.

6. A gun having a firing gun barrel and
   an optical sight for providing a lead angle for a moving target comprising:
   a first telescope having a fixed increasing first magnification for providing a first relatively large image of the target;
   a second telescope having means for providing a selectable increasing second magnification for providing a second image, which is smaller than said first image, of said target, said second magnifications being a function of a characteristic of the relationship of said target to said sight;
   an eyepiece;
   means for simultaneously combining and overlaying said first and said second images and for providing such combined and overlayed image to said eyepiece;
   said first and said second telescopes being each respectively boresighted to said firing gun barrel.

7. A process of sighting a gun against a moving target comprising:
   using a first telescope fixed to said gun to provide a first magnified image of the target to an image combining means and thence to an eyepiece;
   using a second telescope fixed to said gun to provide a second magnified image, selectably smaller than said first image, of the target to said image combining means and thence to said eyepiece;
   initially boresighting both said first and second telescopes to the firing barrel of said gun;
   determining the speed of engagement of said target and selecting the magnification of said second telescope as a function of said speed;
   determining the course and distance of said target;
   aiming said gun to the correct lead angle by moving said gun so that said larger first image is aft of said smaller second image and both are flying along a common path, which path will cross the center of the field of said eyepiece, and which images are spaced apart by a selected multiple of lengths of said second image, which multiple is a function of said course and distance.

* * * * *

UNITED STATES PATENT AND TRADEMARK OFFICE
CERTIFICATE OF CORRECTION

PATENT NO. : 4,483,598
DATED : November 20, 1984
INVENTOR(S) : Robert A. Leightner w/Henry Thibault It is certified that error appears in the above–identified patent and that said Letters Patent are hereby corrected as shown below:

Column 1, line 42, change "300 m" to --zoom--

Column 2, line 58, change "300 m" to --Zoom--

Column 3, line 41, change "and here of firing gun barrel" to --and bore of firing gun barrel--

Signed and Sealed this

Twenty-third Day of April 1985

[SEAL]

Attest:

DONALD J. QUIGG

Attesting Officer

Acting Commissioner of Patents and Trademarks